US008941276B2

(12) United States Patent
Haferman et al.

(10) Patent No.: US 8,941,276 B2
(45) Date of Patent: Jan. 27, 2015

(54) ROTOR ASSEMBLY HAVING BALL NUT CARTRIDGE

(75) Inventors: Daniel Charles Haferman, Marblehead, MA (US); Andrew Joseph LaFosse, Gardner, MA (US); Christopher Alan Pare, Franklin, MA (US)

(73) Assignee: Bose Corporation, Framingham, MA (US)

( * ) Notice: Subject to any disclaimer, the term of this patent is extended or adjusted under 35 U.S.C. 154(b) by 329 days.

(21) Appl. No.: 13/411,060

(22) Filed: Mar. 2, 2012

(65) Prior Publication Data

US 2013/0229074 A1    Sep. 5, 2013

(51) Int. Cl.
| | |
|---|---|
| *H02K 7/116* | (2006.01) |
| *H02K 15/03* | (2006.01) |
| *H02K 1/27* | (2006.01) |
| *H02K 5/173* | (2006.01) |
| *H02K 7/08* | (2006.01) |
| *F16H 25/22* | (2006.01) |

(52) U.S. Cl.
CPC ............ *H02K 1/278* (2013.01); *F16H 25/2204* (2013.01); *F16H 25/2238* (2013.01); *H02K 5/1735* (2013.01); *F16H 25/2233* (2013.01); *H02K 15/03* (2013.01); *H02K 7/085* (2013.01); *H02K 7/116* (2013.01)
USPC ................ 310/83; 310/89; 74/841; 74/89.34; 74/89.37; 74/89.39

(58) Field of Classification Search
CPC ..... H02K 1/278; H02K 5/1735; H02K 7/116; H02K 7/085; H02K 15/03; F16H 25/2204; F16H 25/2233; F16H 25/2238
USPC ........ 310/83, 89; 74/841, 89.34, 89.37, 89.39
IPC .............................................. H02K 7/116,15/03
See application file for complete search history.

(56) References Cited

U.S. PATENT DOCUMENTS

| | | | | |
|---|---|---|---|---|
| 3,402,308 | A | * | 9/1968 | Henschke ........................ 310/80 |
| 4,918,921 | A | * | 4/1990 | Leigh-Monstevens et al. 60/545 |
| 4,987,788 | A | * | 1/1991 | Bausch ......................... 74/89.34 |
| 5,041,748 | A | * | 8/1991 | Huber ............................. 310/80 |
| 5,060,959 | A | * | 10/1991 | Davis et al. ................. 280/5.514 |
| 5,796,198 | A | * | 8/1998 | Sugino et al. ................... 310/89 |
| 7,898,121 | B2 | * | 3/2011 | Ramsay et al. ................. 310/14 |
| 7,963,529 | B2 | | 6/2011 | Oteman et al. | 
| 2001/0015581 | A1 | * | 8/2001 | Sato et al. ....................... 310/12 |
| 2010/0059944 | A1 | * | 3/2010 | Oteman et al. ............ 280/6.157 |
| 2013/0229074 | A1 | * | 9/2013 | Haferman et al. .............. 310/83 |

* cited by examiner

*Primary Examiner* — John K Kim
(74) *Attorney, Agent, or Firm* — Brian M. Dingman; Dingman, McInnes & McLane, LLP

(57) ABSTRACT

In one arrangement, a motor assembly includes a housing defining a housing chamber, a stator disposed within the housing chamber, and a rotor assembly disposed within the housing chamber. The rotor assembly includes a spindle housing defining a spindle housing chamber extending along a longitudinal axis of the spindle housing and a set of magnets disposed about an outer periphery of the spindle housing and in proximity to the stator. The rotor assembly includes a ball nut cartridge disposed within the spindle housing chamber of the spindle housing and a securing mechanism configured to secure the ball nut cartridge to the spindle housing.

21 Claims, 9 Drawing Sheets

ROTOR ASSEMBLY HAVING BALL NUT CARTRIDGE

BACKGROUND

Conventional passive vehicle suspensions employ a spring and shock absorber to isolate body motion from wheel motion. Advances have been made in suspensions by making the suspensions semi or fully active. For example, in fully active suspension systems, a controlled force can be introduced by an actuator, such as an electromagnetic actuator, located between the sprung mass of the vehicle (i.e., the vehicle body) and an unsprung mass of the vehicle (i.e., a wheel assembly) to further minimize disturbances conducted from the interaction of the wheels with the road into the car body.

Conventional vehicles can utilize a variety of electrically controlled active suspension systems. An active suspension system includes an actuator system having a pair of rotary motors disposed on opposing ends of an output shaft and a transmission assembly associated with each of the rotary motors. The transmission assembly converts the rotation of the pair of rotary motors to a linear motion of the output shaft along a single direction.

The transmission assembly of each rotary motor is typically configured as a ball nut that engages a corresponding threaded portion of the output shaft. Conventional rotary motors include a motor housing having a stator and a rotor disposed therein with the ball nut being integrally machined as part of the rotor. Because the ball nut is a relatively high-precision component, in such a configuration, a manufacturer is required to grind the rotor and ball nut from a single piece of hardened material. The integrally-formed ball nut then can engage the output shaft via a set of balls disposed between the ball nut and the output shaft.

SUMMARY

In conventional rotary motors used with a rotary to linear motion conversion mechanism such as a ball nut that interfaces with a ball screw, in order to produce a rotor having an integrally formed ball nut, manufacturers are required to grind the ball nut directly into an inner chamber of the rotor. Such grinding can be costly, as the ball nut requires a relatively high degree of precision with respect to its manufacture. Additionally, because the ball nut is integrally formed as part of the rotor, the ball nut cannot be mechanically isolated from the other mechanical systems in the motor which can lead to binding of the ball nut with the output shaft during operation.

By contrast to conventional motors, embodiments of the present innovation relate to a rotor assembly having a ball nut cartridge. In one arrangement, the rotor assembly includes a spindle housing that defines a chamber and a ball nut cartridge disposed within the spindle housing chamber. The ball nut cartridge is a separate part from (i.e., non-integrally formed relative to) the spindle housing. With such a configuration, the ball nut cartridge can be precision ground from a hardened material. Furthermore, the spindle housing can be manufactured, such as through a turning procedure, from a relatively less dense, unhardened material, using less expensive and less precise machining operations. By separating the rotor from the ball nut and spindle assembly, non magnetic materials can be used for those portions of the assembly that do not perform a magnetic function. Accordingly, the resulting rotor assembly has less mass than conventional rotors which results in the rotor assembly having less inertia and a faster response time during operation. Additionally, the ball nut cartridge can be mechanically isolated from other portions of the motor structure.

In general, one aspect of the disclosure features an actuator assembly, comprising at least one motor assembly and an output shaft moveably coupled to the at least one motor. The at least one motor assembly comprises a motor housing defining a housing chamber, a stator disposed within the motor housing chamber, and a rotor assembly disposed within the motor housing chamber. The rotor assembly comprises a spindle housing defining a spindle housing chamber extending along a longitudinal axis of the spindle housing, a set of magnets disposed about an outer periphery of the spindle housing and in proximity to the stator, a ball nut cartridge disposed within the spindle housing chamber of the spindle housing, and a securing mechanism configured to secure the ball nut cartridge to the spindle housing.

Various additional implementations may include one or more of the following features. The spindle housing can include a stop portion disposed about an inner periphery of the spindle housing within the spindle housing chamber, the ball nut cartridge captured between the securing mechanism and the stop portion. The actuator assembly can further include a set of pins disposed between the stop portion and the ball nut cartridge, the set of pins configured to rotationally secure the ball nut cartridge relative to the stop portion of the spindle housing. The actuator assembly can also further include a spindle housing isolation bushing disposed between a carrier assembly of a bearing assembly and the motor housing. The actuator assembly can further include a cartridge isolation bushing disposed between an outer periphery of the ball nut cartridge and an inner periphery of the spindle housing chamber.

In one implementation, the spindle housing can include a set of threads disposed within the spindle housing chamber and the securing mechanism comprises a nut having a set of threads that correspond to the set of threads of the spindle housing chamber. The spindle housing can include a first spindle housing portion made from a first material and a second spindle housing portion made from a second material, the first material being distinct from the second material. The actuator assembly can include a bearing assembly disposed within the motor housing, the bearing assembly comprising a bearing and a carrier assembly, the bearing being disposed within the carrier assembly, and about the spindle housing the bearing assembly having a longitudinal axis that is substantially collinear with the longitudinal axis of the spindle housing.

In one implementation, the carrier assembly can include a carrier housing and a carrier housing cover, the carrier housing and carrier housing cover configured to capture the bearing there between. The carrier cover can be configured to secure to the carrier housing to define a load path that is substantially collinear with the longitudinal axis of the spindle housing. In one implementation, the at least one motor assembly can include a single motor assembly. In one implementation, the at least one motor assembly can include a first motor assembly and a second motor assembly. In such an arrangement, a first rotor assembly of the first motor assembly and a second rotor assembly of the second motor assembly can be configured to rotate about the longitudinal axis along the same rotational direction. Alternately, a first rotor of the first rotor assembly and a second rotor assembly of the second motor assembly rotate about the longitudinal axis along opposing rotational directions.

In general, another aspect of the disclosure features a motor assembly including a housing defining a housing chamber, a stator disposed within the housing chamber, and a rotor assembly disposed within the housing chamber. The rotor assembly includes a spindle housing defining a spindle housing chamber extending along a longitudinal axis of the spindle housing, a set of magnets disposed about an outer periphery of the spindle housing and in proximity to the stator, a ball nut cartridge disposed within the spindle housing chamber of the spindle housing, and a securing mechanism configured to secure the ball nut cartridge to the spindle housing.

In general, another aspect of the disclosure features a method for assembling a motor assembly. The method includes disposing a stator within a housing chamber of a motor housing, securing a bearing within a carrier assembly to form a bearing assembly, securing a bearing within a carrier assembly to form a bearing assembly, disposing a ball nut cartridge within a spindle housing chamber of the spindle housing, wherein a set of magnets are disposed about an outer periphery of the spindle housing disposed in proximity to the stator, securing the ball nut cartridge to the spindle housing to form a carrier assembly, and securing the carrier assembly to the motor housing.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present innovation relate to a rotor assembly having a ball nut cartridge. In one arrangement, the rotor assembly includes a spindle housing that defines a chamber and a ball nut cartridge disposed within the spindle housing chamber. The ball nut cartridge is a separate part from (i.e., non-integrally formed relative to) the spindle housing. With such a configuration, the ball nut cartridge can be ground from a hardened material, thereby maintaining the manufacturing precision required by the ball nut cartridge. Furthermore, the spindle housing can be manufactured, such as through a turning procedure, from a relatively less dense, unhardened material using lower precision and less expensive machining processes. By separating the rotor from the ball nut and spindle assembly, non magnetic materials can be used for those portions of the assembly that do not perform a magnetic function. Accordingly, the resulting rotor assembly has less mass than conventional rotors which results in the rotor assembly having less inertia and a faster response time during operation. Additionally, the ball nut cartridge can be mechanically isolated from other portions of the motor structure.

Figure 1:
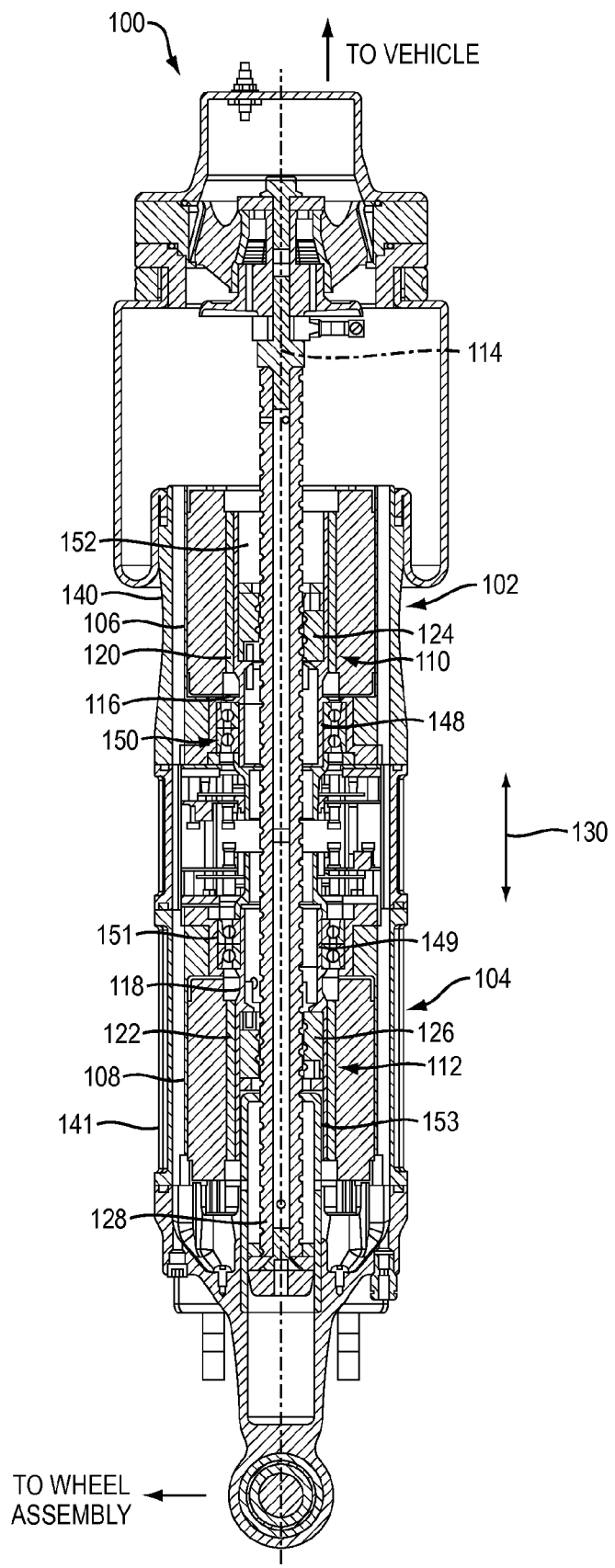
FIG. 1 illustrates a schematic representation of a linear actuator, such as utilized as part of an active suspension system.

FIG. 1 illustrates a schematic depiction of a linear actuator 100, according to one arrangement. The linear actuator 100 includes a first motor assembly 102 and a second motor assembly 104. Each motor assembly 102, 104 includes a stator 106, 108, having a coil and backing ferromagnetic material, and a rotor assembly 110, 112, respectively. Furthermore, each rotor assembly 110, 112 includes a spindle housing 116, 118, a set of magnets 120, 122 disposed about an outer periphery of the spindle housing 116, 118, and a ball nut cartridge 124, 126 secured to the respective spindle housing 116, 118. Each spindle housing 116, 118 includes a first housing portion 148, 149 secured to a housing 140, 141 by a bearing assembly 150, 151 and a second housing portion 152, 153 disposed in proximity to the stator 106. Details of the rotor assemblies 110, 112 will be provided below.

Each spindle housing 116, 118 and ball nut cartridge 124, 126 is configured to rotate around a common, longitudinal axis 114 to position a ball screw linear output shaft 128 along the longitudinal axis 114. For example, during operation, an electrical current source (not shown) passes current through the coils of stators 106, 108 to generate a corresponding rotating magnetic field relative to the respective magnets 120, 122 of the corresponding rotor assemblies 110, 112. Interaction between each magnetic field and the respective magnets 120, 122 causes each rotor assembly 110, 112 to rotate about the longitudinal axis 114. When the rotor assemblies 110, 112 rotate, interaction between each of the ball nut cartridges 124, 126 and the ball screw linear output shaft 128 converts the rotational motion of the rotor assemblies into linear motion 130 of the ball screw linear output shaft 128 along axis 114.

FIGS. 2-8 collectively illustrate details of the first motor assembly 102 and associated rotor assembly 110, according to one arrangement. It should be noted that the description of the details of the first motor assembly 102 is by way of convenience. The second motor assembly 104 and rotor assembly 112 can be configured similarly to the first motor assembly 104 and rotor assembly 110 described below. Although in the depiction shown in FIG. 1 the motor assemblies 102, 104 are configured to rotate in opposite directions in order to obtain linear motion of the ball screw linear output shaft 128, the principles disclosed herein are also applicable to an actuator using a pair of motors configured to rotate in the same direction in order to obtain linear motion of an output shaft. Additionally, although the depiction shown in FIG. 1 illustrates using a pair of rotary motor assemblies 102, 104 coupled to an output shaft 128, the principles described are applicable to actuators where only a single rotary motor is used, and electromagnetic active suspension actuators using a single motor according to the principles described herein are also contemplated. For example, the single rotary motor can be configured as an elongated structure having a first ball nut cartridge disposed within the elongated structure at a first end and a second ball nut cartridge disposed within the elongated structure at a second end of the structure at a distance from the first ball nut cartridge. The distance between the first and second ball nut assemblies provides stability to the output shaft.

Figure 2:
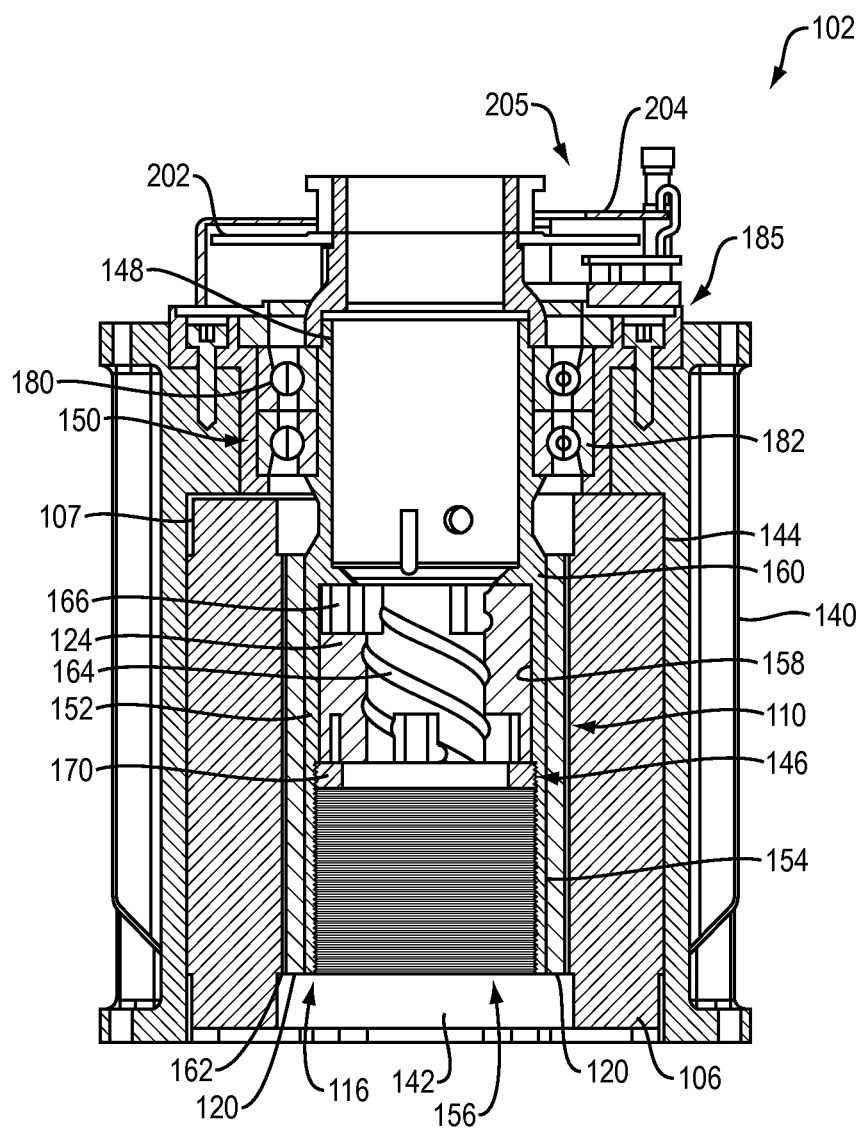
FIG. 2 illustrates a side sectional view of a motor assembly of the linear actuator of FIG. 1, according to one arrangement.
Figure 3:
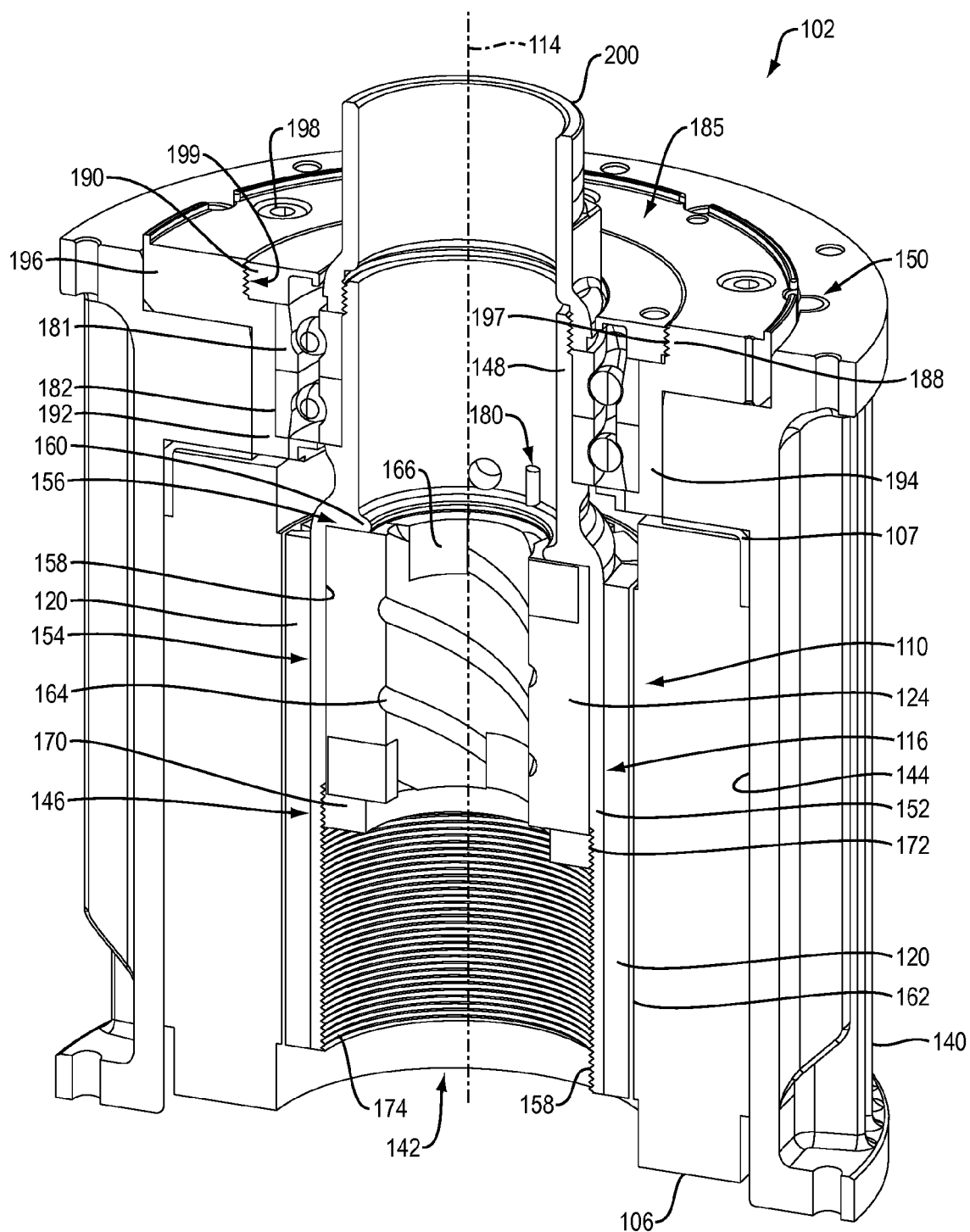
FIG. 3 illustrates a side perspective sectional view of the motor assembly of FIG. 2.

With particular attention to FIGS. 2 and 3, the first motor assembly 102 includes a housing 140 that defines a housing chamber 142 with both the stator 106 and rotor assembly 110 disposed within the housing chamber 142. The housing 140 is configured to be secured or mounted to a fixed object, such as a wheel assembly of a vehicle or alternatively the vehicle frame. As indicated above, the housing 140 contains the stator or coils 106 and a stator cup 107 disposed about an inner periphery 144 of the housing 140. While the housing 140 can be manufactured from a variety of materials, in one arrangement, the housing 140 is manufactured from an aluminum material to aid in the dissipation of heat from the stator 106 during operation.

The rotor assembly 110 includes the spindle housing 116, the ball nut cartridge 124, and a securing mechanism 146. As illustrated, the spindle housing 116 is configured as an elongate structure extending along the longitudinal axis 114. In one arrangement, the spindle housing 116 includes the first housing portion 148 secured to the housing 140 by the bearing assembly 150 and the second housing portion 152 disposed in proximity to the stator 106. As illustrated, the second housing portion 152 includes the set of magnets 120 disposed both about an outer wall or periphery 154 of the spindle housing 116 and in operational proximity to the stator 106. Additionally, the second housing portion 152 defines a spindle housing chamber 156 configured to contain the ball nut cartridge 124. For example, the second housing portion 152 includes an inner wall or periphery 158 and a stop portion 160 that defines the chamber 156. While the stop portion 160 can be configured in a variety of ways, in one arrangement the stop portion 160 is configured as a lip disposed about and extending from the inner periphery 158 of the second housing potion 152. With such a configuration, the stop portion 160 defines an opening that allows the extension and travel of the ball screw linear output shaft 128 there through.

The spindle housing 116 includes the set of magnets 120 disposed about outer periphery 154 of the second housing portion 152. The magnets 120 are disposed in proximity to, and define an air gap 162 with, the stator 106. While the spindle housing 116 can be manufactured from a variety of materials, in one arrangement the spindle housing 116 is manufactured from a non-hardened steel material such as 12L14 steel or any magnetically permeable material, via a turning process.

The ball nut cartridge 124 is disposed within the chamber 156 of the second housing portion 152. The ball nut cartridge 124 includes a set of balls (not shown) carried within a cartridge channel 164. The balls engage the threads on the ball screw linear output shaft 128. As the ball nut cartridge 124 rotates relative to the ball screw linear output shaft 128, the set of balls continuously circulate through the cartridge channels 164 via ball returns 166. While the ball nut cartridge 124 can be manufactured from a variety of materials, in one arrangement, the ball nut cartridge 124 is manufactured from a hardened material, such as SCM420H steel, or 8620 steel, or 4150 steel. In such an arrangement, this allows the ball nut cartridge 124 to be manufactured using a grinding process with a relatively high level of precision. For example, the ball nut cartridge 124 can be ground with a precision that is less than about ±0.010 mm.

Figure 6:
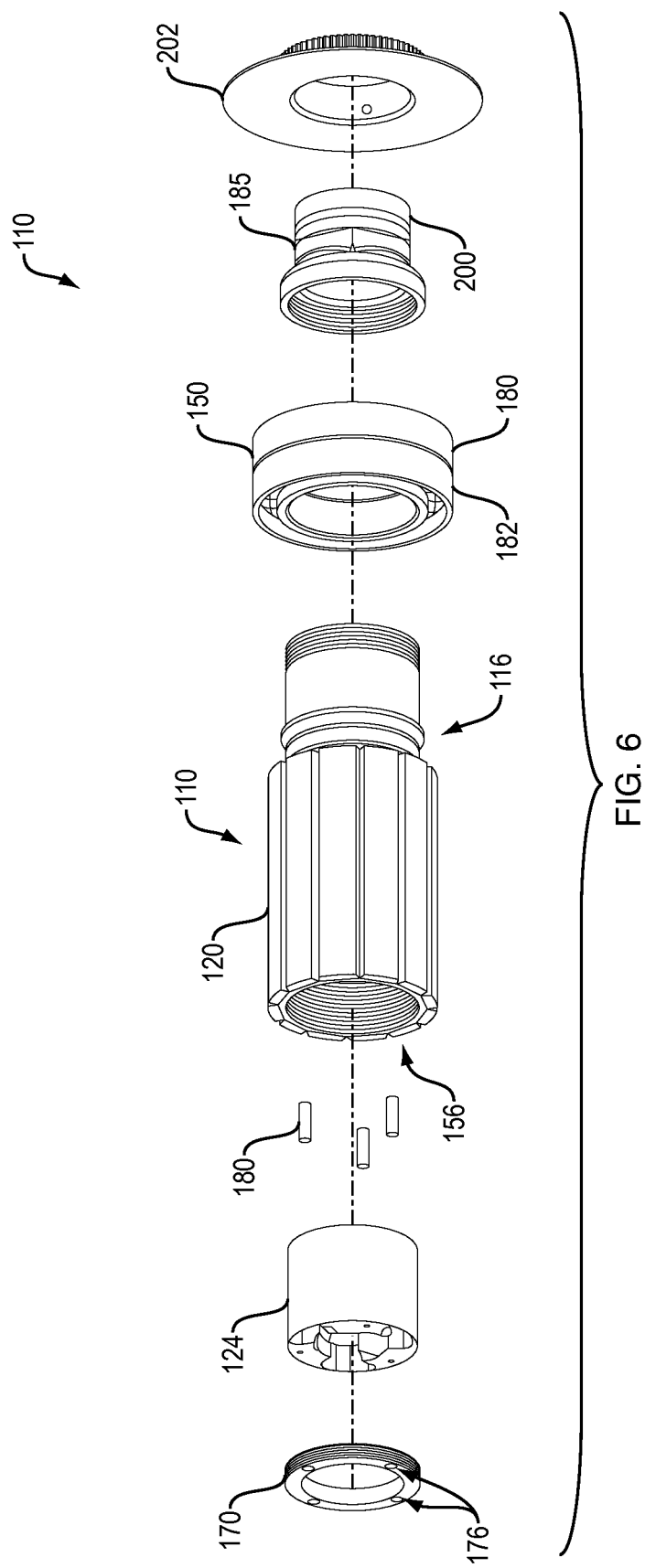
FIG. 6 illustrates an expanded view of the rotor assembly of FIG. 6.
Figure 7:
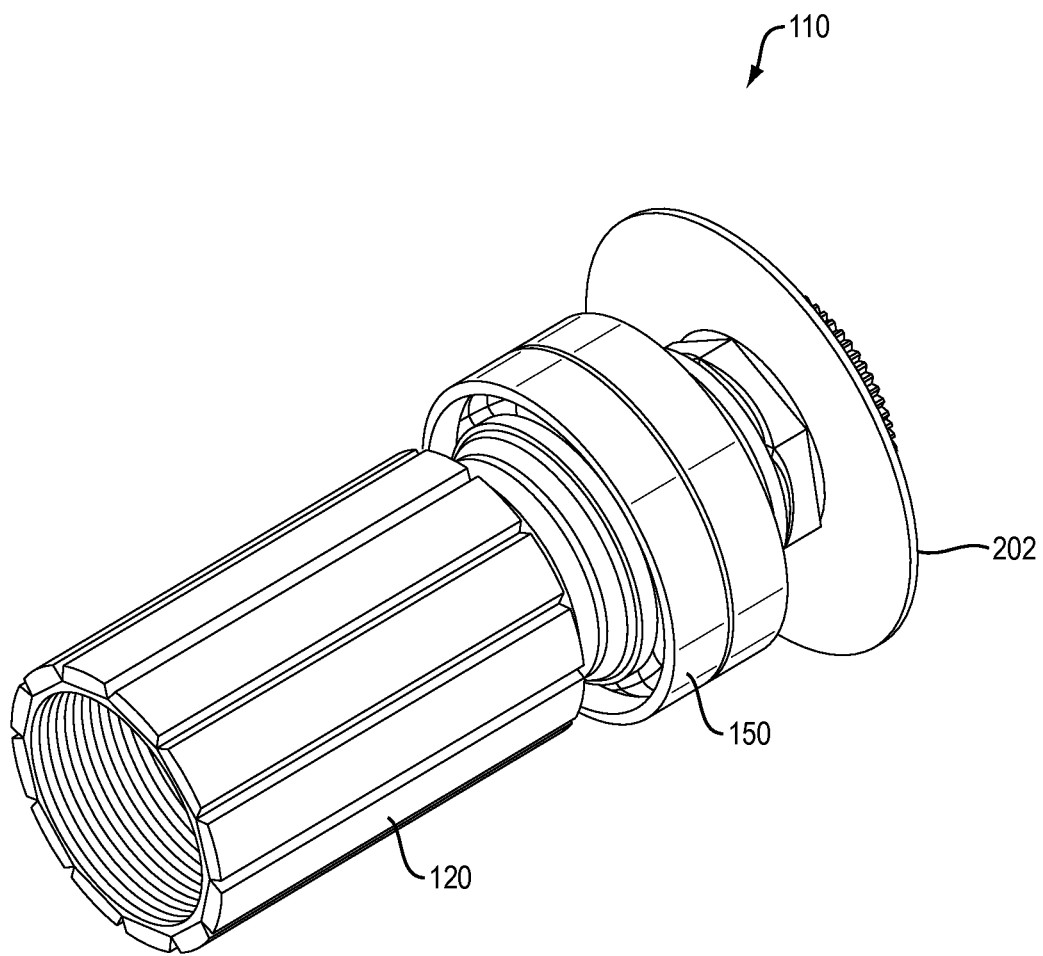
FIG. 7 illustrates a perspective view of the rotor assembly of FIG. 6.

The ball nut cartridge 124, in one arrangement, is secured to the spindle housing 116 with the securing mechanism 146. In one arrangement, the securing mechanism 146 is configured as a spanner nut 170 having threads 172 that matably engage a set of threads 174 disposed about an inner periphery 158 of the second housing portion 152 within the spindle housing chamber 156. In use, the spanner nut 170 compresses the ball nut cartridge 124 against the stop portion 160 to secure the ball nut cartridge 124 to the spindle housing 116. For example, during an assembly procedure, a manufacturer inserts the ball nut cartridge 124 within the spindle housing chamber 156. The manufacturer then engages the threads 172 of the spanner nut 170 with the threads 174 of the second housing portion 152 and, using a tool that engages an engagement portion 176 of the spanner nut such as shown in FIG. 6, rotates the spanner nut 170 about the longitudinal axis 114 of the spindle housing 116 to advance the spanner nut 170 along the longitudinal axis 114 toward the ball nut cartridge 124. As the spanner nut 170 contacts the ball nut cartridge 124, additional advancement of the spanner nut 170 generates an axial load to compresses the cartridge 124 against the stop portion 160, thereby securing the ball nut cartridge 124 to the spindle housing 116.

In one arrangement, the spindle housing 116 also includes an anti-rotation mechanism to limit or prevent the ball nut cartridge 124 from rotating relative to the spindle housing 116, such as during operation. For example with additional reference to FIG. 6, the anti-rotation mechanism is configured as a set of pins 180 disposed between the stop portion and the ball nut cartridge. For example, in one arrangement, the set of pins 180 insert into a corresponding set of openings in the stop portion 160 and into corresponding openings defined in an upper portion of the ball nut cartridge 124 (i.e., the portion of the ball nut cartridge 124 opposing the stop portion 160). The pins 180 can form a friction fit with both the stop portion 160 and the ball nut cartridge 124 to rotationally secure the ball nut cartridge 124 to the stop portion 160. Additionally, an adhesive material (not shown) can be utilized as part of the anti-rotation mechanism to secure the pins 180 to both the stop portion 160 and the ball nut cartridge 124. In another arrangement, the pins 180 are integrally formed as part of the ball nut cartridge 124 and insert within a set of corresponding openings defined by the stop portion 160. In another arrangement, the pins 180 are integrally formed as part of the stop portion 160 and insert within corresponding openings defined by the ball nut cartridge 124. In yet another arrangement, the pins 180 are integrally formed both as part of the ball nut cartridge 124 and as part of the stop portion 160 and insert within a set of corresponding openings defined by the stop portion 160 and the ball nut cartridge 124, respectively. In use, as the spindle housing 116 rotates about the longitudinal axis 114, the anti-rotation mechanism maintains the fixed positioning of the ball nut cartridge 124 within the spindle housing 116 and minimizes rotation of the ball nut cartridge 124 relative to the spindle housing 116.

As further illustrated in FIGS. 2 and 3, the motor assembly 102 includes the bearing assembly 150 which is configured to rotatably support the spindle housing 116 relative to the motor housing 140. For example, the bearing assembly 150 is disposed about the outer periphery 154 of the first housing portion 148 of the spindle housing 116 between the spindle housing 116 and the motor housing 140 and is configured to allow the spindle housing 116 to rotate relative to the motor housing 140 during operation. While the bearing assembly 150 can be configured in a variety of ways, in one arrangement, the bearing assembly 150 includes a set of bearings, such as steel bearings, and a carrier assembly 185 that contains the bearings.

In one arrangement, the set of bearings includes first and second bearings 181, 182 disposed about the outer periphery 154 of the first housing portion 148 of the spindle housing 116. The set of bearings 181, 182 maintains a defined space between the spindle housing 116 and the motor housing 140. For example, the set of bearings 181, 182 maintains a separation between the first housing portion 148 and an inner periphery 144 of the motor housing 140 and also maintains an air gap 162 between the magnets 120 disposed on the second housing portion 152 and the stator 106.

During operation, as current supplied to the coils of the stator 106 causes the spindle housing 116 to rotate about the longitudinal axis 114 of the motor assembly 102, the power dissipated in the coils of the stator 106 generates heat which is absorbed by the motor housing 140 and carried to other components of the motor assembly 104. However, because a coefficient of thermal expansion mismatch exists between the motor housing material (e.g., aluminum) and the bearing material (e.g., steel), heating and cooling of the motor housing 140 can cause the set of bearings 181, 182 to expand and contract at a rate that is different from that of the motor housing 140. Such a difference in expansion and contraction can affect the fit of the set of bearings 181, 182 relative to the motor housing 140 and the precision of the positioning of the magnets 120 relative to the stator 106. In one arrangement, to minimize the effect of heating and cooling on the fit between the set of bearings 181, 182 and the motor housing 140, as well as the internal preload state of the set of bearings 181, 182, the carrier assembly 185 is utilized to secure the set of bearings 181, 182 to the housing 140 where the carrier assembly 185 is manufactured from a material having a substantially similar coefficient of thermal expansion as the set of bearings 181, 182. For example, the carrier assembly 185 can be manufactured from a steel material.

Figure 4:
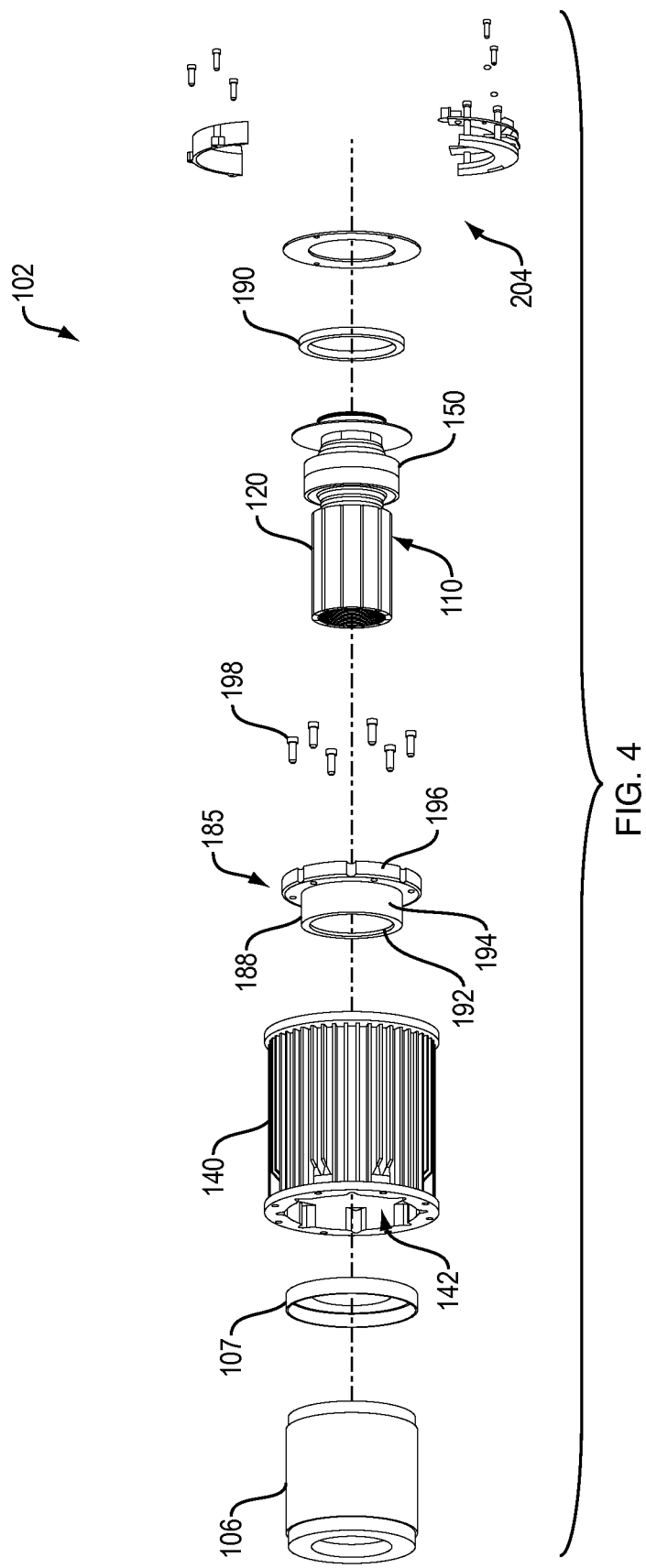
FIG. 4 illustrates an expanded view of the motor assembly of FIG. 2

With specific reference to FIGS. 3 and 4, the carrier assembly 185 includes a carrier housing 188 and a carrier housing cover 190. In one arrangement, the carrier housing 188 is configured as a cup shaped container sized to hold the set of bearings 181, 182, and is disposed between an inner periphery 144 of the motor housing 140 and an outer portion of the set of bearings 181, 182. For example, the carrier housing 188 includes a seat portion 192, a wall portion 194 extending longitudinally from the seat potion 192, and a flange portion 196 extending radially from the wall portion 194. The seat portion 192 and wall portion 194 are configured to contain the set of bearings 181, 182 while the flange portion 196 is configured to secure the carrier assembly 185 to the motor housing 140, such as by a set of fasteners 198.

The carrier housing cover 190 is configured to secure the set of bearings 181, 182 to the motor housing 140 via the carrier housing 188. For example the carrier housing cover 190 is configured as a spanner nut having a set of threads 197 disposed about its outer periphery. The threads matably engage a corresponding set of threads 199 disposed on an inner periphery of the flange portion 196. When threaded into place, the carrier housing cover 190 generates a load against both the wall portion 194 of the carrier housing 188 and the set of bearings 181, 182 to secure the set of bearings 181, 182 to the motor housing 140. A load path generated by the carrier housing cover 190 on the set of bearings 181, 182 is substantially collinear with the longitudinal axis 114 of the spindle housing 116. With the load path oriented in this manner, the load generated by the carrier housing cover 190 on the set of bearings 181, 182 remains substantially constant.

Figure 5:
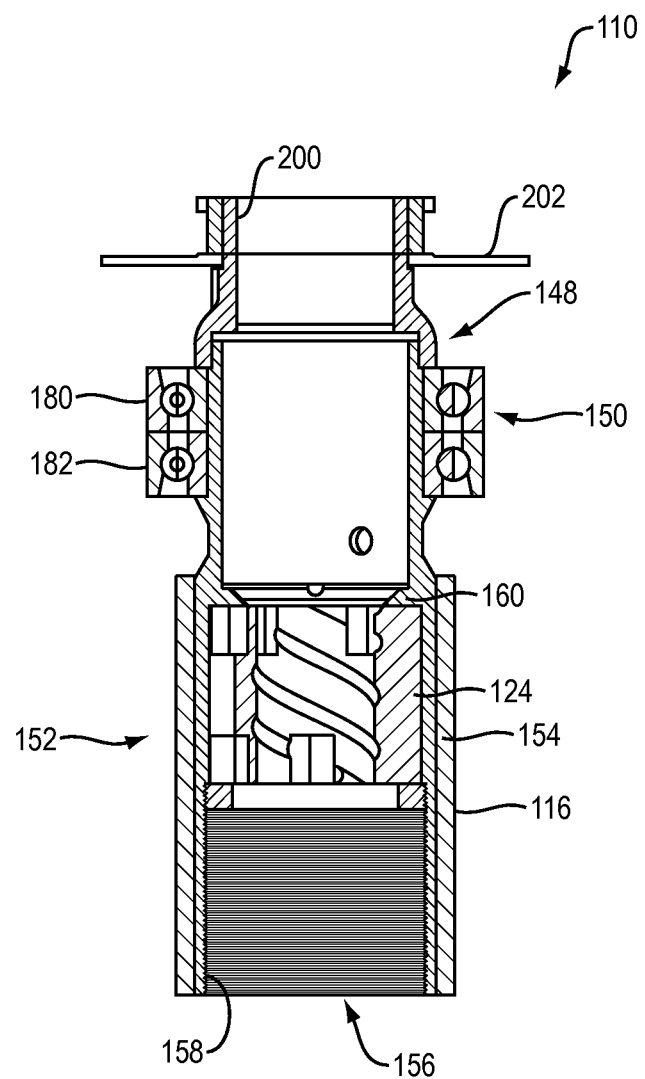
FIG. 5 illustrates a side sectional view of a rotor assembly of the motor assembly of FIG. 2.

In one arrangement, as illustrated in FIGS. 2 and 4-6, the motor assembly 102 includes a position sensing assembly or rotary encoder 205 configured to detect and indicate the position of the ball screw linear output shaft 128 relative to the motor assembly 100, as well as the rotational position of the spindle housing 116. Such position detection allows control electronics (not shown) to enable precise knowledge and control of the actuator's position. In one arrangement, as shown in FIGS. 5 and 6, the position sensing assembly includes a sensor spindle 200 coupled to the spindle housing 116 and an encoded disc 202 coupled to the sensor spindle 200. A sensor 204, shown in FIG. 4, detects rotational position of the encoded disc 202 and provides a position signal to the controller, the signal being representative of the linear position of the output shaft 128 and the rotational position of the spindle housing 116.

During an assembly procedure for the motor assembly, a manufacturer first disposes the stator 106 within the housing chamber 142 of the motor housing 140. The manufacturer can then secure the carrier housing 188 into an installation fixture, install the set of bearings 181, 182 into the carrier housing 188 and secure the set of bearings 181, 182 to the carrier housing 188 with the carrier housing cover 190, such as a spanner nut, to form the bearing assembly 150. Next the manufacturer inserts a set of pins 180 into a corresponding set of openings in the stop portion 160 of the first housing portion 148 of the spindle housing 116, inserts a torque reaction pin (not shown) through the spindle housing 116, and disposes at least a portion of the spindle housing 116 within the bearing assembly 150. The manufacturer then can align the openings defined in the upper portion of the ball nut cartridge 124 with the set of pins 180, dispose the ball nut cartridge 124 within the spindle housing chamber 156 of the spindle housing 116 and secure the ball nut cartridge 124 to the spindle housing 116, such as with a spanner nut 170 to form the rotor assembly 110. The manufacturer can then remove the rotor assembly 110 from the installation fixture, remove torque reaction pin from the spindle housing 116, secure the rotor assembly 110 to the motor housing 106, and install the position sensing assembly or rotary encoder 205 on the motor housing 106.

Figure 8:
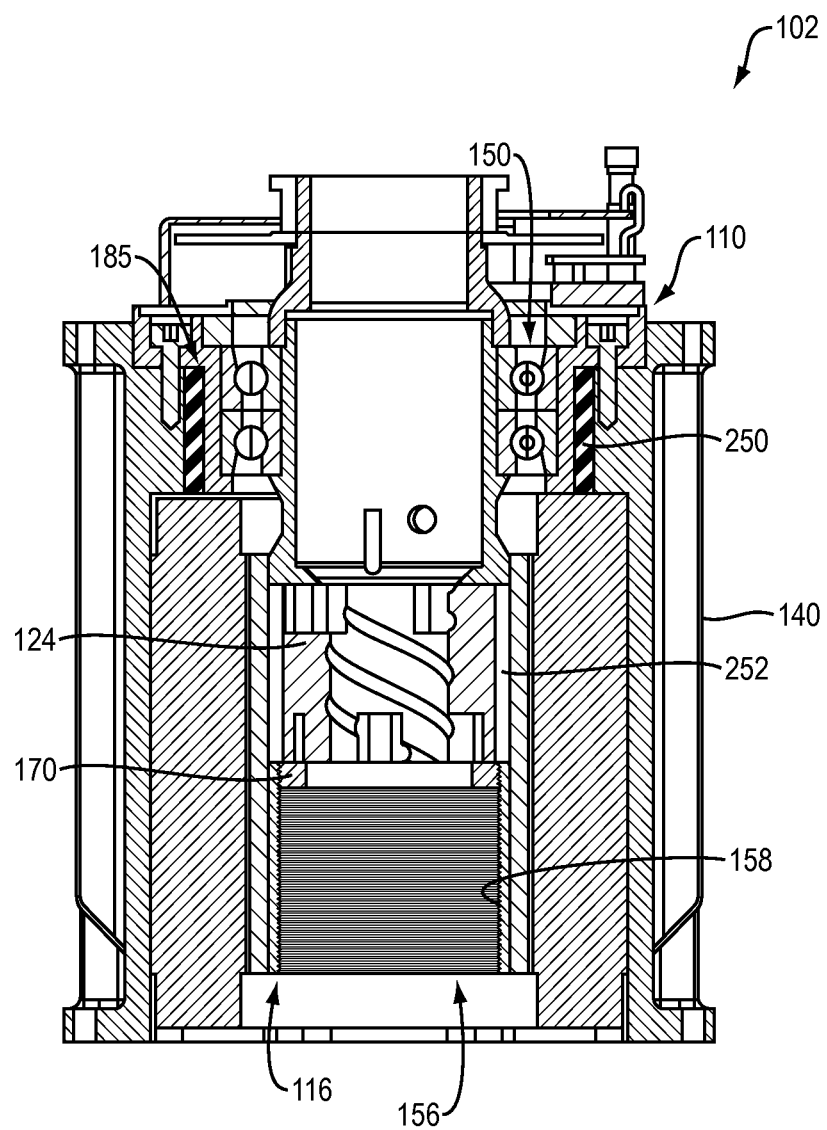
FIG. 8 illustrates a side sectional view of a motor assembly having a spindle housing isolation bushing and a ball nut cartridge isolation bushing.

In one arrangement, reference to FIG. 8, the rotor assembly 110 includes an isolation bushing 250 configured to isolate the carrier assembly 185 from the motor housing 140. For example, the rotor assembly 110 can include the isolation bushing 250 disposed between the carrier assembly 185 and the motor housing 140 and extending about the outer periphery of the carrier assembly 185. The isolation bushing 250 minimizes or suppresses the effect of noise and vibration of the motor assembly 102 on the operation of the rotor assembly 110 by isolating both noise and vibration from being transmitted between the carrier assembly 185 and the motor case or housing 140.

For example, internal clearances between the ball nut cartridge 124 and the ball screw linear output shaft 128 can generate noise that may be transmitted into the housing 140 and radiated out to the passenger's ears. The spindle housing isolation bushing 250 breaks the path of this noise/vibration transmission to reduce the degree of noise that is transmitted to the passenger. In one arrangement, the spindle housing isolation bushing 250 can provide such a break in the path between the bearing assembly 150 and the motor housing 140. While the spindle housing isolation bushing 250 can be manufactured from a variety of materials in one arrangement, the spindle housing isolation bushing 250 is manufactured from a rubber material, such as a molded rubber component, or a viscoelastic material.

In another arrangement, the ball nut cartridge 124 includes a cartridge isolation bushing 252 configured to isolate the ball nut cartridge 124 from the spindle housing 116. For example, with continued reference to FIG. 8, the isolation bushing 252 can be disposed between an outer periphery of the ball nut cartridge 124 and an inner periphery 158 of the spindle housing chamber 156. The cartridge isolation bushing 252 mechanically isolates the ball nut cartridge 124 from the other mechanical systems in the motor assembly 110 by isolating both noise and vibration from being transmitted between the ball nut cartridge 124 and the motor case or housing 140. For example, the spindle housing isolation bushing 252 can provide a break in the path between the ball nut cartridge 124 and the spindle housing 116 (e.g., by floating the ball nut cartridge 124 in an isolating cocoon) to reduce the degree of noise that is transmitted to the passenger. As a result, the cartridge isolation bushing 252 can suppress the effect of noise and vibration between the motor assembly 110 and the ball nut cartridge 124 and minimize binding of the ball nut cartridge 124 with the output shaft 128 during operation.

Figure 9:
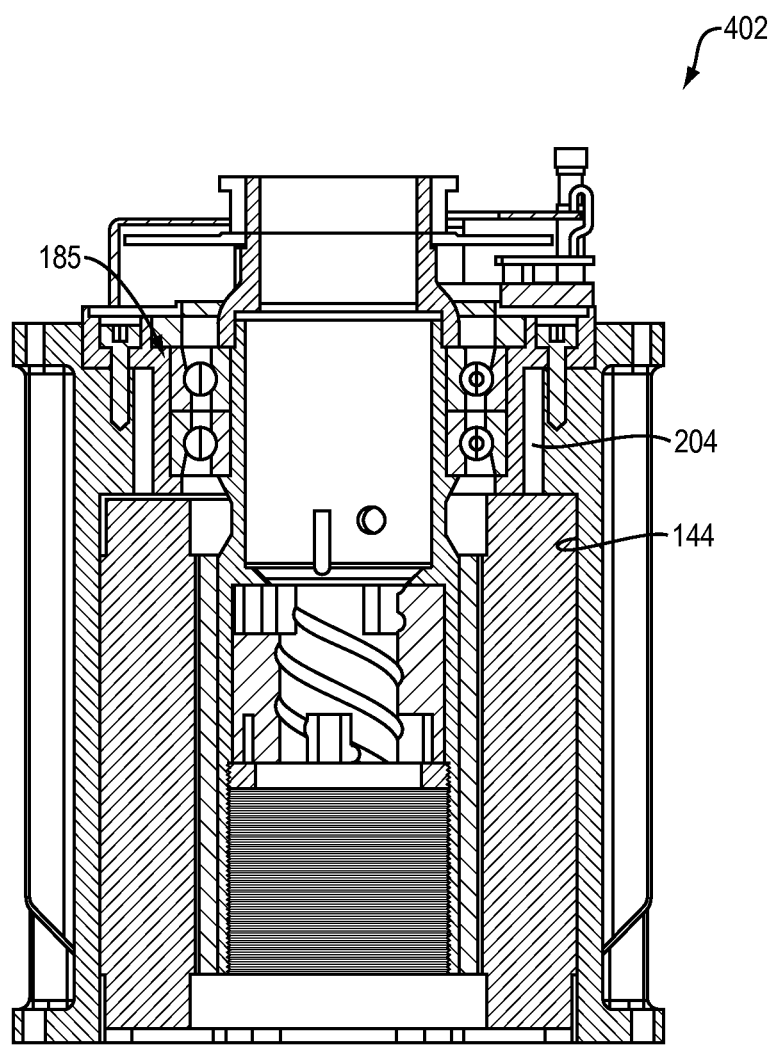
FIG. 9 illustrates a side sectional view of a motor assembly having a rotor assembly that defines an air gap with an inner periphery of the motor housing.

In another arrangement, with reference to FIG. 9, an outer periphery of the carrier assembly 185 defines an air gap 204 with an inner periphery 144 of the housing 140. The air gap provides a thermal barrier or break between the motor housing 140 and the carrier assembly 185 to minimize the effect of heating and cooling of the motor housing 140 on the operation of the spindle housing 116 and bearing assembly 150.

As indicated above, the spindle housing 116 can be manufactured from a single material. Such description is by way of example only. In one arrangement, portions of the spindle housing 116 are manufactured from distinct materials. For example, with reference to FIG. 3, the spindle housing 116 can be configured with the first spindle housing portion 148 made from a relatively low mass material, such as aluminum, while the second spindle housing portion 152 made from a steel material to support the magnets 120 of the rotor assembly 110. The use of relatively lower mass materials as part of the spindle housing 116 reduces the overall mass, as well as the inertia, of the spindle housing 116. As a result, the rotor assembly 110 can operate at a faster response time relative to conventional rotor assemblies.

With such a configuration of the motor assembly 104, the mass of the spindle housing 116 and rotor assembly is less than the mass of conventional spindles and rotor assemblies. With less mass, the spindle housing 116 has a relatively smaller inertia and a faster response time during operation than conventional rotor assemblies.

As described above, the bearing assembly 150 includes a first and second bearing 181, 182, such as steel bearings, contained within the carrier assembly 185. Such description is by way of example only. In one arrangement, the bearing assembly 150 includes a single bearing contained within the carrier assembly 185.

While various embodiments of the invention have been particularly shown and described, it will be understood by those skilled in the art that various changes in form and details may be made therein without departing from the spirit and scope of the innovation as defined by the appended claims.

What is claimed is:

1. An actuator assembly, comprising:
   at least one motor assembly; and
   an output shaft moveably coupled to the at least one motor, the at least one motor assembly comprising:
   a motor housing defining a housing chamber,
   a stator disposed within the motor housing chamber,
   a rotor assembly disposed within the motor housing chamber, the rotor assembly comprising:
      a spindle housing defining a spindle housing chamber extending along a longitudinal axis of the spindle housing;
      a set of magnets disposed about an outer periphery of the spindle housing and in proximity to the stator;
   a ball nut cartridge disposed within the spindle housing chamber of the spindle housing; and
   a securing mechanism configured to secure the ball nut cartridge to the spindle housing;
   wherein the spindle housing comprises a stop portion disposed about an inner periphery of the spindle housing within the spindle housing chamber, the ball nut cartridge captured between the securing mechanism and the stop portion; and
   a set of pins disposed between the stop portion and the ball nut cartridge, the set of pins configured to rotationally secure the ball nut cartridge relative to the stop portion of the spindle housing.

2. The actuator assembly of claim 1, further comprising a spindle housing isolation bushing disposed between a carrier assembly of a bearing assembly and the motor housing.

3. The actuator assembly of claim 1, further comprising a cartridge isolation bushing disposed between an outer periphery of the ball nut cartridge and an inner periphery of the spindle housing chamber.

4. The actuator assembly of claim 1, wherein:
   the spindle housing comprises a set of threads disposed within the spindle housing chamber; and
   the securing mechanism comprises a nut having a set of threads that correspond to the set of threads of the spindle housing chamber.

5. The actuator assembly of claim 1, wherein the spindle housing comprises a first spindle housing portion made from a first material and a second spindle housing portion made from a second material, the first material being distinct from the second material.

6. The actuator assembly of claim 1, comprising:
   a bearing assembly disposed within the motor housing, the bearing assembly comprising a bearing and a carrier assembly, the bearing being disposed within the carrier assembly, and about the spindle housing the bearing assembly having a longitudinal axis that is substantially collinear with the longitudinal axis of the spindle housing.

7. The actuator assembly of claim 6, wherein the carrier assembly comprises a carrier housing and a carrier housing cover, the carrier housing and carrier housing cover configured to capture the bearing there between.

8. The actuator assembly of claim 7, wherein the carrier cover is configured to secure to the carrier housing to define a load path that is substantially collinear with the longitudinal axis of the spindle housing.

9. The actuator assembly of claim 1, wherein the at least one motor assembly comprises a single motor assembly.

10. The actuator assembly of claim 1, wherein the at least one motor assembly comprises a first motor assembly and a second motor assembly.

11. The actuator assembly of claim 10, wherein a first rotor assembly of the first motor assembly and a second rotor assembly of the second motor assembly rotate about the longitudinal axis along the same rotational direction.

12. The actuator assembly of claim 10, wherein a first rotor of the first rotor assembly and a second rotor assembly of the second motor assembly rotate about the longitudinal axis along opposing rotational directions.

13. A motor assembly, comprising:
   a housing defining a housing chamber;
   a stator disposed within the housing chamber;
   a rotor assembly disposed within the housing chamber, the rotor assembly comprising:
      a spindle housing defining a spindle housing chamber extending along a longitudinal axis of the spindle housing;

a set of magnets disposed about an outer periphery of the spindle housing and in proximity to the stator;
a ball nut cartridge disposed within the spindle housing chamber of the spindle housing; and
a securing mechanism configured to secure the ball nut cartridge to the spindle housing; and
an isolation hushing disposed between an outer periphery of the ball nut cartridge and an inner periphery of the spindle housing chamber.

14. The motor assembly of claim 13, wherein the spindle housing comprises a stop portion disposed about an inner periphery of the spindle housing within the spindle housing chamber, the ball nut cartridge captured between the securing mechanism and the stop portion.

15. The motor assembly of claim 14, further comprising a set of pins disposed between the stop portion and the ball nut cartridge, the set of pins configured to rotationally secure the ball nut cartridge relative to the stop portion of the spindle housing.

16. The motor assembly of claim 13, further comprising a spindle housing isolation bushing disposed between a carrier assembly of a bearing assembly and the motor housing.

17. The motor assembly of claim 13, wherein:
the spindle housing comprises a set of threads disposed within the spindle housing chamber; and
the securing mechanism comprises a nut having a set of threads that correspond to the set of threads of the spindle housing chamber.

18. The motor assembly of claim 13, wherein the spindle housing comprises a first spindle housing portion made from a first material and a second spindle housing portion made from a second material, the first material being distinct from the second material.

19. The motor assembly of claim 13, comprising:
a bearing assembly disposed within the motor housing, the bearing assembly comprising a bearing and a carrier assembly, the bearing being disposed within the carrier assembly, and about the spindle housing the bearing assembly having a longitudinal axis that is substantially collinear with the longitudinal axis of the spindle housing.

20. The motor assembly of claim 19, wherein the carrier assembly comprises a carrier housing and a carrier housing cover, the carrier housing and carrier housing cover configured to capture the bearing there between.

21. The motor assembly of claim 20, wherein the carrier cover is configured to secure to the carrier housing to define a load path that is substantially collinear with the longitudinal axis of the spindle housing.

* * * * *